United States Patent
Eo et al.

(10) Patent No.: US 6,799,914 B2
(45) Date of Patent: Oct. 5, 2004

(54) ARABIC-PERSIAN ALPHABETH INPUT APPARATUS

(75) Inventors: Yoon-Hyoung Eo, Seoul (KR); Jang-Sung Choi, Gyeonggi-do (KR)

(73) Assignee: Timespace System Co., Ltd., Seoul (KR)

( * ) Notice: Subject to any disclaimer, the term of this patent is extended or adjusted under 35 U.S.C. 154(b) by 0 days.

(21) Appl. No.: 10/362,844
(22) PCT Filed: Jun. 27, 2001
(86) PCT No.: PCT/KR01/01105
§ 371 (c)(1), (2), (4) Date: Feb. 27, 2003
(87) PCT Pub. No.: WO03/003184
PCT Pub. Date: Jan. 9, 2003

(65) Prior Publication Data
US 2004/0105714 A1 Jun. 3, 2004

(51) Int. Cl.[7] .................................................. B41J 5/08
(52) U.S. Cl. ........................ 400/484; 400/472; 341/22; 345/168
(58) Field of Search ............................... 400/472, 484; 341/22; 345/168

(56) References Cited

U.S. PATENT DOCUMENTS

| | | | | |
|---|---|---|---|---|
| 4,507,734 A | * | 3/1985 | Kaldas | 715/535 |
| 4,527,919 A | * | 7/1985 | Aoun | 400/111 |
| 4,951,202 A | * | 8/1990 | Yan | 715/535 |
| 5,197,810 A | * | 3/1993 | Zhang et al. | 400/110 |
| 5,236,268 A | * | 8/1993 | Chang | 400/484 |
| 5,305,207 A | * | 4/1994 | Chiu | 715/535 |
| 5,724,031 A | * | 3/1998 | Huang | 341/128 |
| 6,604,878 B1 | * | 8/2003 | Wong | 400/484 |
| 2003/0035674 A1 | * | 2/2003 | Daoud | 400/109 |

FOREIGN PATENT DOCUMENTS

GB    2175723 A  * 12/1986 ......... H03M/11/00

* cited by examiner

Primary Examiner—Andrew H. Hirshfeld
Assistant Examiner—Dave A. Ghatt
(74) Attorney, Agent, or Firm—Keusey, Tutunjian & Bitetto, P.C.

(57) ABSTRACT

The present invention relates to an Arabic-Persian Alphabet input apparatus having ten or more basic keys on which basic figures extracted from analyzed forms of the Arabic Alphabet are inscribed, respectively. The basic key input signals are combined to easily and simply input the Arabic Alphabet to miniaturized and multi-functional electronic appliances such as cell phones whose buttons (keys) are limited in number. Further, the Arabic characters are inputted in the same manner as handwriting without having to particularly remember the Persian Alphabet.

18 Claims, 6 Drawing Sheets

Fig. 1

| Independent Alphabet ||
|---|---|
| ا | ط |
| أ | ظ |
| إ | ع |
| ب | غ |
| ت | ف |
| ث | ق |
| ج | ل |
| خ | ك |
| ح | م |
| د | ن |
| ذ | ه |
| ر | ة |
| ز | و |
| س | ؤ |
| ش | ي |
| ص | ئ |
| ض | ئ |
| . | ء |

| Vowel Alphabet |
|---|
| ́ |
| و |
| |
| ́ |
| ̈ |
| ؤ |
| |
| ̈ |
| ه |
| |
| ̃ |

ARABIC-PERSIAN ALPHABETH INPUT APPARATUS

TECHNICAL FIELD

The present invention relates to an Arabic-Persian Alphabet input device and, more particularly, to an Arabic-Persian Alphabet input device that can easily input Arabic and Persian using a keyboard and be applied to cellular phones whose buttons (keys) are limited in number as various electronic appliances such as a personal computer trend toward miniaturization.

DESCRIPTION OF RELATED ART

Arabic Alphabet is made up of 28 consonants and 8 vowels. The consonants are independently used, and the vowels change pronunciations of other characters. Except that there are four different characters, Persian Alphabet is substantially identical to the Arabic Alphabet.

Unlike Latin Alphabets, the Arabic-Persian Alphabet has characteristics as follows: (1) a morphological relationship between characters is relatively low; (2) each of the vowels is disposed over or under each of the consonants; (3) in any case, the vowels may be omitted; and (4) a consonant shape is varied depending on whether one consonant is consecutive to another consonant.

Therefore, it is very difficult to apply the Arabic-Persian Alphabet to electronic input devices such as keyboard whose buttons (keys) are limited in number.

With the remarkable advance in electric and electronic technologies, electronic appliances such as cell phones, personal digital assistant (PDA), pagers, game machines, remote controllers, cameras, and home electronics trend toward miniaturization and high-tech. Note that the cell phones include CDMA phones, PCS phones, TDMA phones, GSM phones, AMPS phones, and IMT-2000 phones. As functions of the electronic appliances are improved, there is an increasing requirement for expressing and inputting characteristics to the electronic appliances. Accordingly, what is needed is to develop methods (apparatus) for inputting the Arabic-Persian Alphabet to a cell phone whose buttons (keys) are limited in number.

SUMMARY OF THE INVENTION

In order to overcome the foregoing disadvantages, the present invention provides an Arabic-Persian Alphabet input apparatus based on a handwriting manner. Since the Arabic-Persian Alphabet input apparatus according to the invention automatically or manually determines the disposal of two or more consecutive characters, users need not remember the disposal of the characters.

The Arabic-Persian Alphabet input apparatus according to the invention includes an Alphabet input unit, an Alphabet database unit, an Alphabet extracting unit, a form database unit, and a combined form determining unit.

Without a specific mention, the "Arabic" means not only Arabic but also Persian.

The Alphabet input unit is a kind of an input device such as keyboard, a keypad or a touch screen, and has a plurality of basic keys and one function key. Ten or more basic figures, which are extracted from analyzed Arabic Alphabet forms, are allocated to the basic keys. It will be understood that special function keys (e.g., a send key, a pause key, menu keys etc. in a cell phone) needed in electronic appliances may be added to the basic keys. Also an Arabic-Number-English shift key and special character input keys may be added thereto, if necessary.

As mentioned above, the pure Arabic Alphabet is made up of 28 consonants (hereinafter referred to as "Independent Alphabet" including their varied characters) and 8 vowels (hereinafter referred to as "Vowel Alphabet"), as shown in FIG. 1. In case of the Persian, the Independent Alphabet of four characters corresponding to the Arabic vowels is added.

The Vowel Alphabet has a small number of characters and simple forms, while the Independent Alphabet has a large number of characters and complicated forms. Therefore, the basic figures are preferably extracted from forms of the Independent Alphabet. A function key in the Alphabet input unit may be a space key or a shift key. The function key serves to indicate that inputting a series of Arabic words or a group of Arabic words is completed, and serves to shift a cursor of an input window by one point. When inputting characters ıٳﺞ ذرز where no character follows, it is preferable that a function key input signal is automatically generated to shift the cursor by one point.

The Alphabet database unit stores information on each coded Arabic character so as to correspond to combinations of basic key input signals in the Alphabet input unit. When a basic key input signal is initially inputted from the Alphabet input unit or is inputted following a function key signal, the Alphabet extracting unit searches the Alphabet data base unit to extract an Arabic character corresponding to the combination of the inputted basic key signal. The Alphabet database unit is physically stored in a storage such as a random access memory (RAM) or a read-only memory (ROM). The Alphabet extracting unit may be a kind of a program. The Alphabet database unit and the Alphabet extracting unit may be physically monolithic database or database programs.

Except the characters ıٳﺞ ذرز, characters of the Independent Alphabet generally change in their forms when they are disposed at the beginning, middle, and ending of the words. Thus, the form database unit stores information on combined forms of consecutive characters. Since the Vowel Alphabet is located over or under the Independent Alphabet, the form database unit preferably stores the location information of the Vowel Alphabet.

In a case where a character extracted by the Alphabet extracting unit is consecutive to a previously extracted character, the combined form determining unit searches the form database unit to determine a combined form of the extracted two characters.

One or two variation keys may be added to the basic keys. Characters of the Vowel Alphabet, which are disposed over and under characters of the Independent Alphabet to change pronunciations thereof, are inscribed on the variation keys.

In a case where a variation key ՟ is added, when a variation key input signal is inputted one, twice, three times, four times, five times, six times, and seven times, the Alphabet database unit additionally includes information that the inputted signals are regarded as the Vowel Alphabet based oh the displayed order thereof. And the form database unit additionally stores position information of characters that are disposed over or under the characters of the Arabic Alphabet to change their pronunciations.

In a case where two variation keys are added, characters disposed over characters of the Independent Alphabet are inscribed on a first variation key ՟ and characters disposed thereunder are inscribed on a second variation key ՟. In this case, the Alphabet database unit additionally includes information that when a first variation key input signal is inputted one, twice, three time, and four times, the inputted signals are regarded as ՟, ՟, ՟, and ՟, respectively. Further, the Alphabet database unit additionally includes information that when the second variation key input signal is inputted once and twice, the inputted signals are regarded as ՟ and ՟ respectively.

Although "Arabic" or "Persian" are used in this specification, it will be understood that the input apparatus according to the invention may be applied to the Alphabets of languages having a similarity in forms to the "Arabic" or "Persian".

The embodiments of the present invention will now be described more fully hereinafter with reference to accompanying drawings. The embodiments and drawings are merely examples of the invention, and various modifications and alterations may be made without departing from the spirit an scope of the invention.

BRIEF DESCRIPTION OF DRAWINGS

FIG. 1 is a table of the Arabic Alphabet;

DETAILED DESCRIPTION OF PREFERRED EMBODIMENTS

Figure 2:
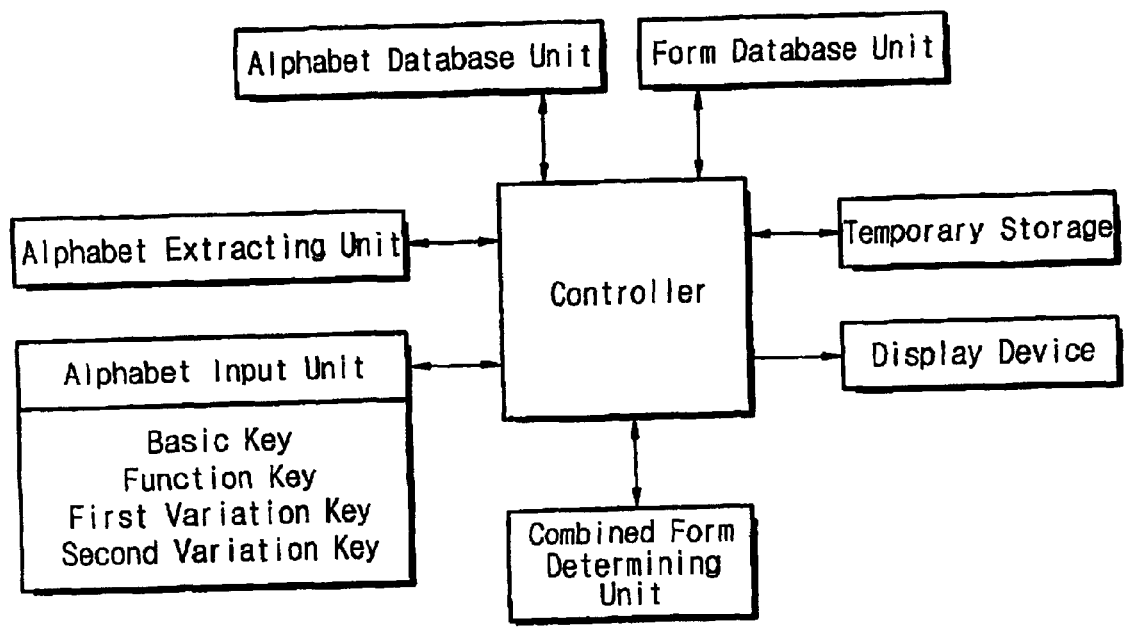
FIG. 2 is a schematic diagram of an Arabic-Persian Alphabet input apparatus according to the present invention.

An Arabic-Persian Alphabet input apparatus according to the invention is schematically illustrated in FIG. 2. The input apparatus includes an Alphabet input unit having basic keys, a function key, a first variation key, and a second variation key, an Alphabet database unit for storing information for a character corresponding to combinations of the basic keys and Alphabet information for the variation keys, an Alphabet extracting unit for receiving a signal of the Alphabet input unit and searching the Alphabet database unit to extract a character corresponding the input signal, a form database unit for storing information on combined forms of characters, and a combined form determining unit for searching the form database unit to determine a combined form of an presently extracted character and a previously extracted character.

A controller for controlling the operating relationship between components may be independently constructed. If necessary, the input apparatus further includes a temporary storage for temporarily storing inputting information or completed Arabic words or a group of words and a display device for displaying the steps of determining the Arabic Alphabet.

The foregoing components are just functionally divided, and need not be physically independent of one another. For example, it will be understood that the Alphabet database unit, the Alphabet extracting unit, the form database unit, and a combined form determining unit are made of one program or one part, if necessary.

Further, a person skilled in the art may readily add input keys and their functions for inputting special figures such as quotation, rest, and period, Arabic-English-Number shift, and a space bar.

BEST MODE FOR CARRYING OUT THE INVENTION

Embodiment 1

In the first embodiment, there are ten basic figures ح, ب, ا, ص, ء, د, ه, •, ر, and ح that are applied to basic keys. The basic figures are disposed on a keyboard, a keypad or a touch screen, respectively (see FIG. 3). If necessary, one variation key (e.g., Vowel Alphabet characters ـَ ـُ ـِ ٰ ـً ـٌ ـٍ are inscribed thereon) or two variation keys (e.g., Vowel Alphabet characters ـَ ـُ ـِ ٰ and ـً ـٌ ـٍ are inscribed thereon, respectively) may be added. Two variation keys are added to the input apparatus shown in FIG. 3. Function keys are not shown in FIG. 3.

The following "table 1" shows the corresponding relationship between selected basic figures and associated characters.

TABLE 1

| Basic Figures | Associated Characters | Basic Figures | Associated Characters |
|---|---|---|---|
| ح | ج, ح, چ, ع, غ, ع, ه | د | د, ذ |
| ب | ب, ت, ث, س, ف, ض, ص, ش, ق, ك, ن, ي, ئ, ي, ة | ه | و, ة, ه, ق, ف, ي, ؤ |
| ا | ا, أ, إ, ط, ظ, ل, ك, م | • | ز, ذ, خ, ث, ت, غ, ظ, ض, ش, ف, ق, ن, ة, ژ |
| ص | ص, ض, ط, ظ, ص, م | ر | ژ, ؤ, و, ل, ذ, ز, ر |
| ء | ء, أ, ء, ك, ؤ, ئ | ح | ل, ج, ي, چ, ب, ة |

Figure 3:
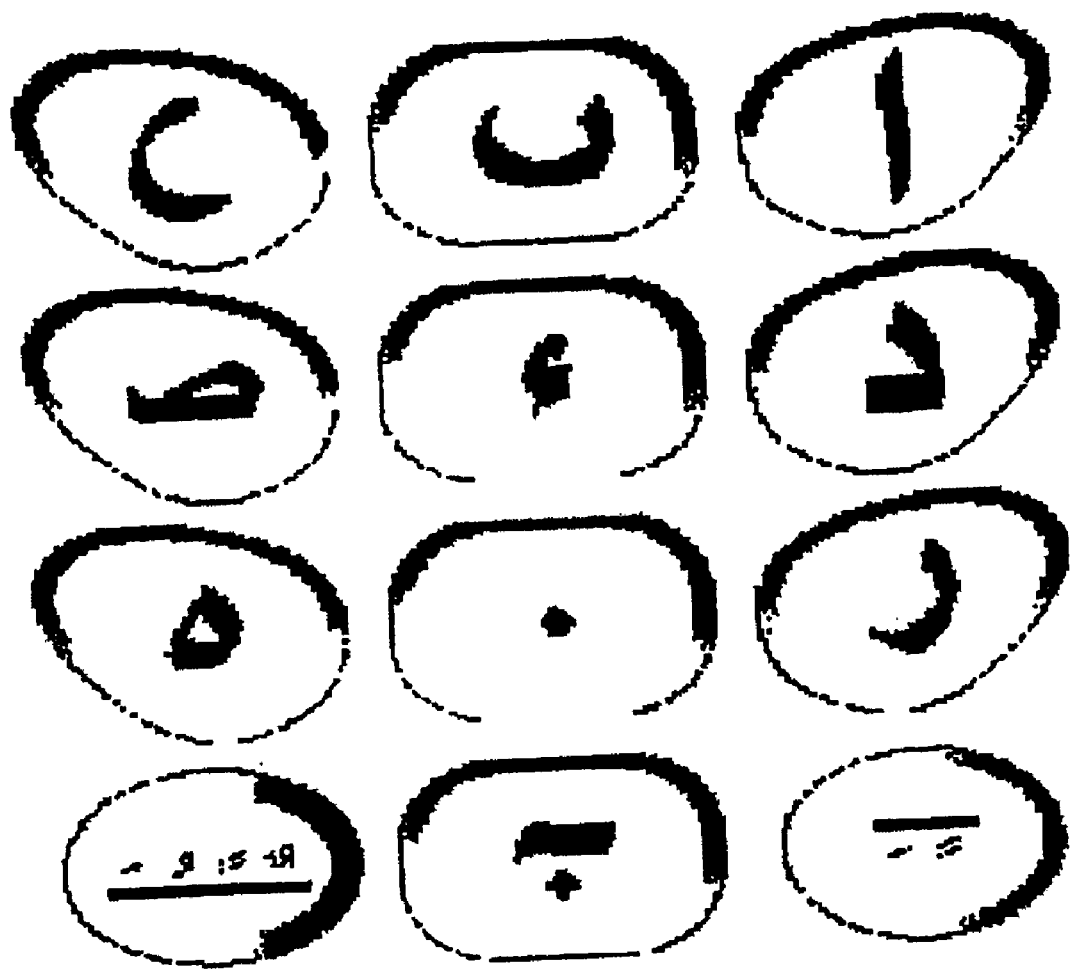
FIG. 3 through FIG. 6 are exemplary diagrams of key arrangements of an Alphabet input unit in the Arabic-Persian Alphabet input apparatus according to the present invention.

The following "table 2" shows the corresponding relationship between Arabic Independent Alphabet characters and combinations of basic figure key input signals in the Alphabet input unit of FIG. 3. In this case, the Alphabet coding information shown in FIG. 2 is stored in the Alphabet database unit.

TABLE 2

| Pressed Key (s) | Corresponding Character | Pressed Keys | Corresponding Character |
|---|---|---|---|
| اا or ا | ا | اء | أ |
| ب · | ن | اءء | إ |
| بح | ب | ب ·· | ت |

TABLE 2-continued

| Pressed Key (s) | Corresponding Character | Pressed Keys | Corresponding Character |
|---|---|---|---|
| ㅜㄷ | ح | ui ··· | ث |
| دد or د | د | ㅜㅜ or ㅜㄷㅜ | ج |
| رر or ر | ر | ㅜ· or ㅜㄷ· | خ |
| سس or سسس | س | د· | ذ |
| صس | ص | ر· | ز |
| اص | ط | سس·, سس··, سس···, سسس·, سسس·· or سسس··· | ش |
| دد | ع | صس· | ض |
| هس or هس· | ف | اص· | ظ |
| اس | ل | دد· | غ |
| اه | م | هس· or هس·· | ق |
| هه or ه | ه | دء, سء or اسء | ك |
| هد or صد | و | ه· or ه·· | ة |
| سد | ي or ى | سدء | ئ or ى |
| سء or دسء | ئ | هء, صء, هدء or صدء | ؤ |
| ㅜㅜㅜ or ㅜㄷㅜㅜ | چ | سㅜㅜ or سㅜㅜㅜ | پ |
| د·· | ژ | دسㅜ | گ |

Of the basic figures, the figure · corresponding to an upper point and the figure ㅜ corresponding to an lower point are completely added to other characters. A function key, on which the figure ء is inscribed, is added to other characters or independently used.

Therefore, most characters can be inputted using two basic keys. Since characters needing the upper or lower point or ء are inputted by pressing basic keys twice or more, a basic key signal inputted shortly after inputting the upper or lower point or a ء key input signal becomes coding information for extracting other characters.

Note that the ء can be independently used. When the ء is independently used behind other characters, it is preferable that the ء is displayed after one point is spaced, and a cursor awaits another character input after one point is spaced again.

The Arabic input examples according to the invention are shown in the following "table 3". The finally completed sentence means "Current Arabic".

TABLE 3

| Pressed Keys (Direction→) | اا, اس, دد, دد, سㅜ, سد, ه·, function key, اا, اس, هاء, ㅜㄷ, اا, دد, سㅜ··, ه· |
|---|---|
| Corresponding Characters (Direction←) | العربية المعاصرة |

TABLE 3-continued

| | |
|---|---|
| Consecutive Forms of Corresponding Characters (Direction←) | الـوربيـة الـمـحادثة |
| Finally Completed Sentence (Direction←) | العربية المحادثة |

Embodiment 2

In the second embodiment, there are ten basic figures ى, ب, ح, ص, ء, ا, ه, ◦, and ر that are applied to basic keys. The basic figures are disposed on a keyboard, a keypad or a touch screen, respectively (see FIG. 4). If necessary; one variation key (e.g., Vowel Alphabet characters ـَ ـُ ـِ ـْ ـّ ـً are inscribed thereon) or two variation keys (e.g., Vowel Alphabet characters ـَ ـُ ـِ and ـْ ـّ ـً are inscribed thereon, respectively) may be added. Two variation keys are added to the input apparatus shown in FIG. 4. Function keys are not shown in FIG. 4.

The following "table 4" shows the corresponding relationship between selected basic figures and associated characters.

TABLE 4

| Basic Figure | Associated Characters | Basic Figure | Associated Characters |
|---|---|---|---|
| ى | ع, غ, د, ذ, ج, ى | ح | ع, غ, ج, خ, ح |
| ب | س, ث, ت, ب, ف, ض, ص, ش, ي, ن, ك, ق, پ, ٹ | ه | و, ة, ه, ق, ف, ي, ؤ |
| ا | ا, أ, إ, ط, ظ, ذ, م, ك | ـ | ز, ت, ث, خ, ذ, ت, غ, ض, ظ, ش, ژ, ة, ن, ق, ف, ى |
| ص | ظ, ط, ض, ص, م | ر | ژ, ؤ, و, ل, ذ, ر |
| ء | ا, إ, ء, ك, ؤ | ـ | پ, ج, ي, چ, ب, ى |

Figure 4:
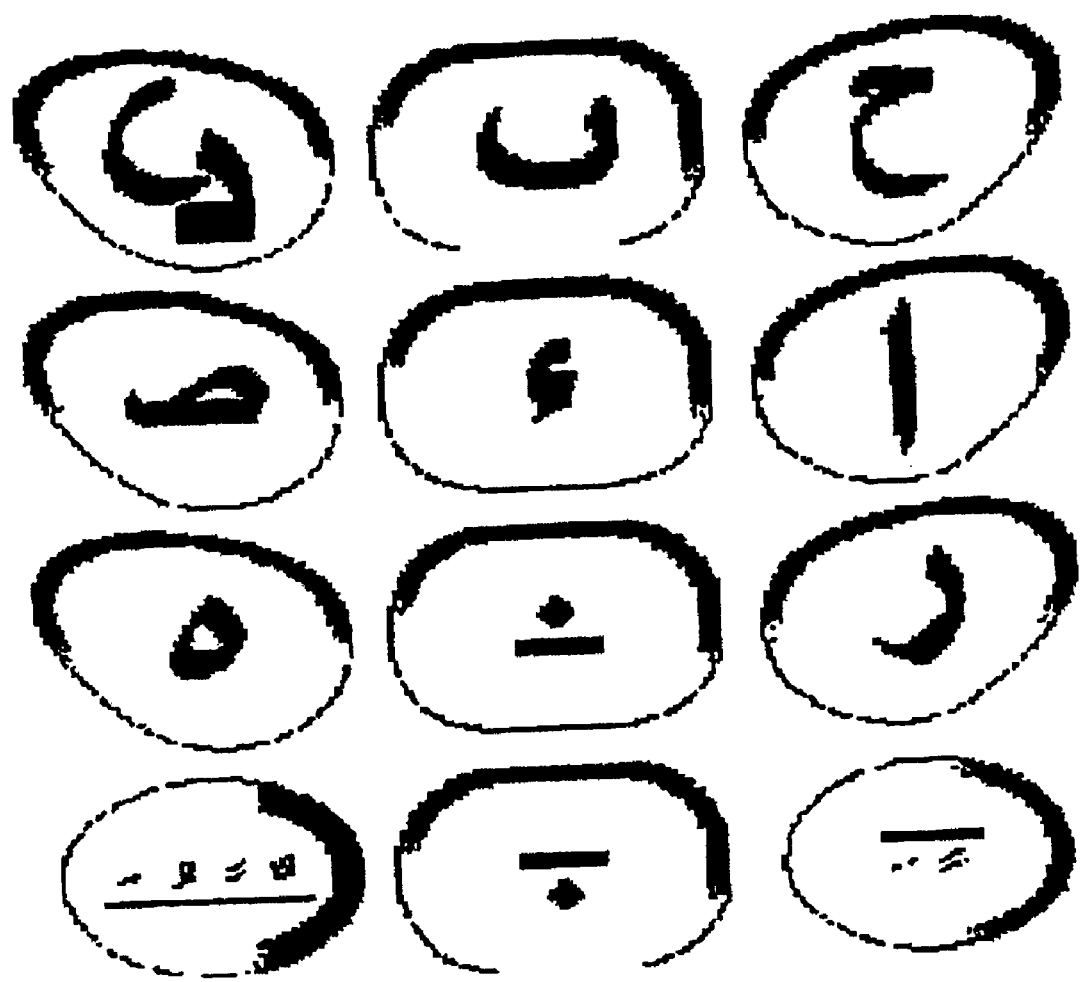
Figure 5:
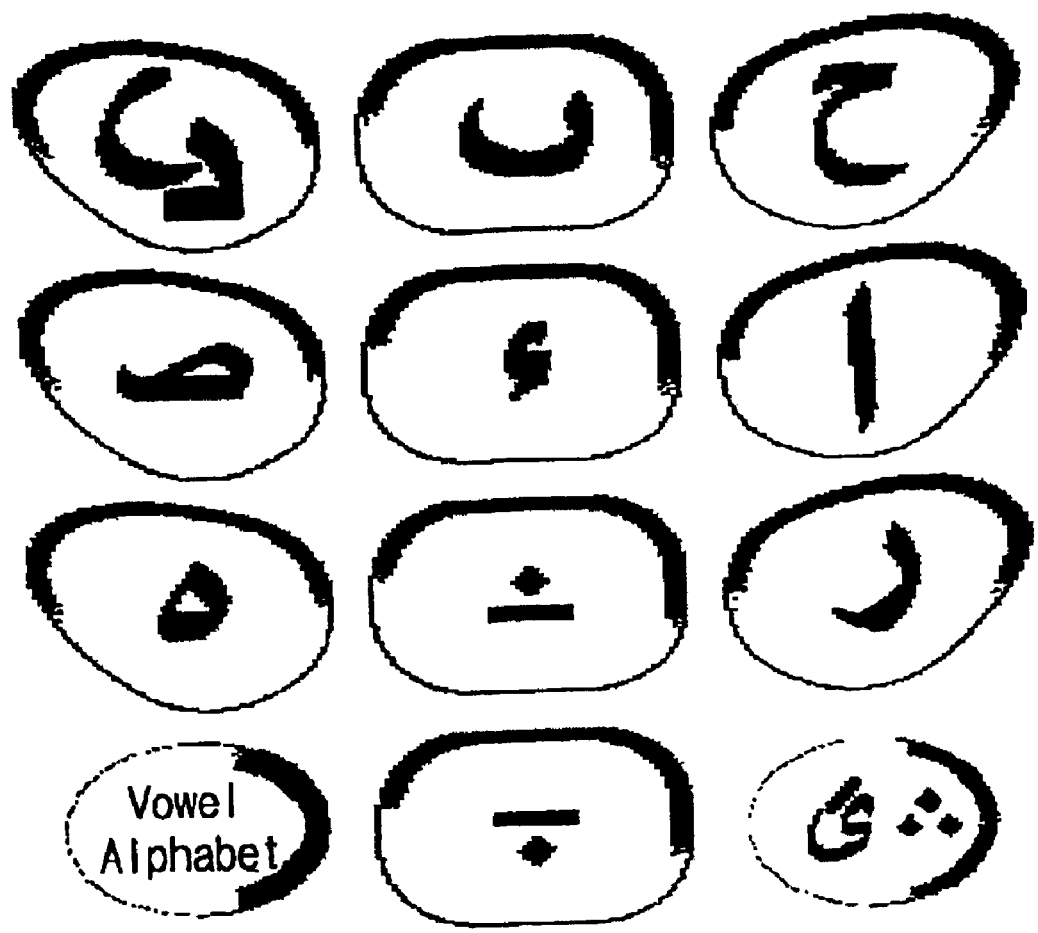

The following "table 5" shows the corresponding relationship between the Arabic Independent Alphabet characters and combinations of basic figure input signals from the Alphabet input unit of FIG. 4. In this case, Alphabet coding information shown in FIG. 5 is stored in an Alphabet database unit.

TABLE 5

| Pressed Key(s) | Corresponding Character | Pressed Keys | Corresponding Character |
|---|---|---|---|
| اا or ا | ا | اء | أ |
| بـ | ن | اءء | إ |
| بـ | ب | بـ | ت |
| حح or ح | ح | بـ | ث |
| ىى or ى | د | حـ | ج |
| رر or ر | ر | حـ | خ |
| سس or سسس | س | ىـ | ذ |
| صب | ص | ـر | ز |

TABLE 5-continued

| Pressed Key(s) | Corresponding Character | Pressed Keys | Corresponding Character |
| --- | --- | --- | --- |
| اص | ط | ښښ, ښښښ, ښښښښ, ښښښ, ښښښښ or ښښښښښ | ش |
| عى | ع | ښصى | ض |
| ەب or ەښ | ف | ښاص | ظ |
| با | ل | ښعى | غ |
| اە | م | ەښ or ەښښ | ق |
| ەە or ە | ە | ءد, ءى or ءاى | ك |
| ەد or صد | و | ەښ or ەښښ | ة |
| بى | ى or ي | ءبى | ئ or ى |
| ءى or ءىع | ڭ | ءد, ءص, ءدە or ءصە | ؤ |
| ⸚⸚⸚ or ⸚ى⸚ | چ | ب⸚⸚ or ب⸚⸚ | پ |
| ښد | ژ | ىبښ or ىبښ | گ |

Of the basic figures, the figure ∙ corresponding to an upper point and the figure ⸚ corresponding to a lower point are completely added to other characters. A function key, on which the figure ء is inscribed, is added to other characters or independently used.

Therefore, most characters can be inputted using two basic keys. Since characters needing the upper or lower point or ء are inputted by pressing basic keys twice or more, a basic key signal inputted shortly after inputting the upper or lower point or a ء key input signal becomes coding information for extracting other characters.

Note that the ء can be independently used. When the ء is independently used behind other characters, it is preferable that the ء is displayed after one point is spaced, and a cursor awaits another character input after one point is spaced again.

The Arabic input examples according to the invention are shown in the following "table 6". The finally completed sentence means "Current Arabic".

TABLE 6

| Pressed Keys (Direction→) | ll, lب, عى, دد, بـ, عب, ەښ, function key, ll, lب, ءا, صص, ll, عى, بښښ, ەښ |
| --- | --- |
| Corresponding Characters (Direction←) | العربية المحادثة |
| Consecutive Forms of Corresponding Characters (Direction←) | الوربية المحادثة |
| Finally Completed Sentence (Direction←) | العربية المحادثة |

Embodiment 3

In the third embodiment, there are eleven basic keys including the ten basic keys of the first embodiment and one basic key on which a basic figure  is inscribed (see FIG. 5). One variation key, on which  is inscribed, is applied to an Arabic-Persian Alphabet input apparatus shown in FIG. 5. A function key is not shown in FIG. 5.

Of the corresponding relationship shown in the above "table 2", the signal combinations of , , , and  are substituted for the corresponding relationship shown in the following "table 7". The Alphabet coding information of FIG. 7 is stored in an Alphabet database unit.

TABLE 7

| Pressed Keys | Corresponding Character | Pressed Keys | Corresponding Character |
|---|---|---|---|
|  or |  |  or  |  |
|  |  |  |  |

Embodiment 4

Figure 6:
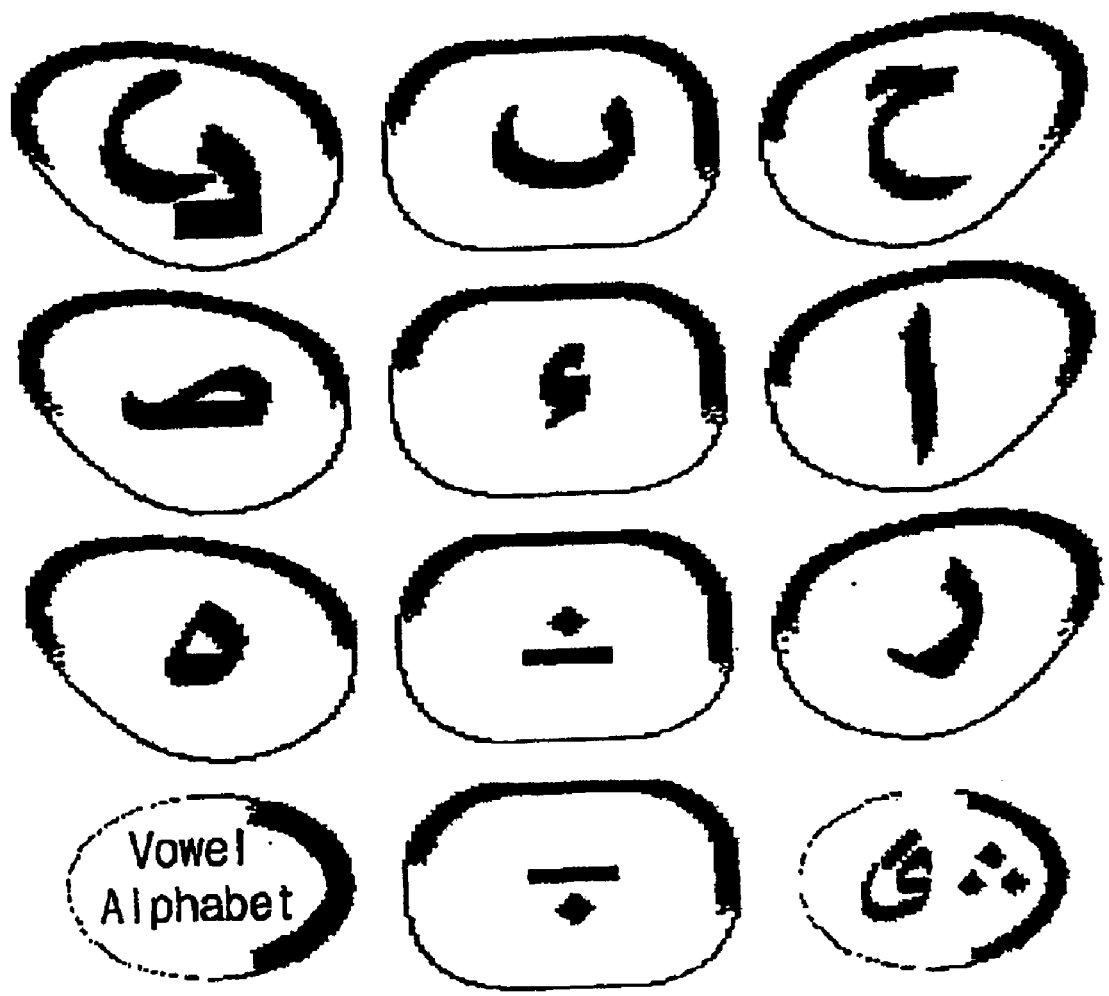

In the fourth embodiment, there are eleven basic keys including the ten basic keys of the first embodiment and one basic key on which a basic figure  is inscribed (see FIG. 6). One variation key, on which  is inscribed, is applied to an Arabic-Persian Alphabet input apparatus shown in FIG. 6. A function key is not shown in FIG. 6.

Of the corresponding relationship shown in the above "table 5", the signal combinations of , , , and  are substituted for the corresponding relationship shown in the following "table 8". The Alphabet coding information of FIG. 8 is stored in an Alphabet database unit.

TABLE 8

| Pressed Keys | Corresponding Character | Pressed Keys | Corresponding Character |
|---|---|---|---|
|  or |  |  or  |  |
|  |  |  or  |  |

INDUSTRIAL APPLICABILITY

The Arabic-Persian Alphabet input apparatus according to the present invention extracts at least ten basic morphemes of the Arabic Alphabet. Using the combinations of the extracted morphemes, the input apparatus determines characters. Since all Arabic characters can be inputted by means of limited keys, the input apparatus is expected to find use in a small-sized keyboard, a keypad, and a touch screen of miniaturized and multi-functional electronic appliances such as cell phones. Further, users can easily input Arabic in the same manner as handwriting without particularly memorizing the Arabic.

What is claimed is:

1. An Arabic-Persian Alphabet input apparatus comprising:

an Alphabet input unit having basic keys and one function key, wherein ten or more basic figures extracted from analyzed forms of Arabic Alphabet are allocated to the basic keys, the basic keys further comprising at least one variation key to indicate figures to be attached over or under Arabic characters to vary their pronunciations;

an Alphabet database unit for storing Arabic Alphabet information coded to correspond to basic key input signal combinations of the Alphabet input unit;

an Alphabet extracting unit for searching the Alphabet database unit to extract Arabic alphabets corresponding to combinations of initial basic key input signals inputted from the Alphabet input unit or basic key input signals following a function key signal;

a form database unit for storing information on combined forms of consecutive characters; and a combined form determining unit for, when a character extracted by the Alphabet extracting unit is consecutive to a previously extracted character, searching the form database unit to determine a combined form of the two extracted characters.

2. The input apparatus as in claim 1, wherein the function key is a space key or a direction key.

3. The input apparatus as in claim 1, wherein the basic keys further include variation keys on which figures  attached over or under Arabic characters to vary their pronunciations are inscribed;

wherein the Alphabet database unit further stores information for recognizing a character according to an order displayed on the key when the variation key input signal is inputted once, twice, three time, four times, five times, six times, and seven times; and wherein the form database unit further stores information on attachment positions of Arabic characters attached over or under characters to vary their pronunciations.

4. The input apparatus as in claim 1, wherein the basic keys further include a first variation key  on which Arabic characters attached over characters to vary their pronunciation are inscribed, and a second variation key  on which Arabic characters attached under characters to vary their pronunciations are inscribed;

wherein the Alphabet database unit further stores information for recognizing , , , and  when the first variation key input signal is inputted once, twice, three times, and four times respectively, and information for recognizing  and  when the second variation key input signal is inputted once and twice respectively; and wherein the form database unit further stores information on attachment positions of Arabic characters attached over or under the characters to vary their pronunciations.

5. The input apparatus as in claim 1, wherein when the extracted characters are , , , , ,  and  which are only used at the ends of words or an independent character  the combined form determining unit further includes a function to make a space at the next position of the characters.

6. The input apparatus as in claim 1, wherein the basic figures allocated to the basic keys include , , , , , , , , and .

7. The input apparatus as in claim 6, wherein the Alphabet database unit stores information for, when ﺍﺍ or ﺍ key signal is sequentially inputted, recognizing ﺍ;

when ں key signals are sequentially inputted, recognizing ن;

when ںﭞ key signals are sequentially inputted, recognizing ب;

when ﭞح key signals are sequentially inputted, recognizing ح;

when ﺩﺩ or ﺩ key signal is sequentially inputted, recognizing ﺩ;

when ﺭﺭ or ﺭ key signal is sequentially inputted, recognizing ﺭ;

when ﺍﺍ or ﺍﺍﺍ key signals are sequentially inputted, recognizing س;

when ﺹﺍ key signals are sequentially inputted, recognizing ص;

when ﻁﺍ key signals are sequentially inputted, recognizing ط;

when ﻉﻉ key signals are sequentially inputted, recognizing ع;

when ﻩﺍ or ﻩﺍ· key signals are sequentially inputted, recognizing ﻑ;

when ﺍﻭ key signals are sequentially inputted, recognizing ﻝ;

when ﻩﺍ key signals are sequentially inputted, recognizing ﻡ;

when ﻩﻩ or ﻩ key signal is sequentially inputted, recognizing ﻩ;

when ﻩﺭ or ﺹﺭ key signals are sequentially inputted, recognizing ﻭ;

when ﭞﻭ key signals are sequentially inputted, recognizing ﻱ or ; and when ﻭﻉ or ﭞﻭﻉ key signals are sequentially inputted, recognizing ﺝ.

8. The input apparatus as in claim 6, wherein the database unit stores information for, when ﺍ· key signals are sequentially inputted, recognizing ﺍ;

when ﺍ·· key signals are sequentially inputted, recognizing ﺍ;

when ﻭ·· key signals are sequentially inputted, recognizing ن;

when ﻭ··· key signals are sequentially inputted, recognizing ﺙ;

when ﭞﭞ or ﭞحﭞ key signals are sequentially inputted, recognizing ﺝ;

when ﭞ· or ﭞح· key signals are sequentially inputted, recognizing ﺥ;

when ﺩ· key signals are sequentially inputted, recognizing ﺫ;

when ﺭ· key signals are sequentially inputted, recognizing ﺯ;

when ﻭﻭ·, ﻭﻭ··, ﻭﻭ···, ﻭﻭﻭ·, ﻭﻭﻭ·· or ﻭﻭﻭ··· key signals are sequentially inputted, recognizing ش;

when ﺹﻭ· key signals are sequentially inputted, recognizing ض;

when ﻁﺍ· key signals are sequentially inputted, recognizing ظ;

when ﻉﻉ· key signals are sequentially inputted, recognizing غ;

when ﻩﻭ· or ﻩﻭ·· key signals are sequentially inputted, recognizing ﻑ;

when ﺭﺀ, ﻭﺀ or ﺍﺀ key signals are sequentially inputted, recognizing ﻙ;

when ﻩ· or ﻩ·· key signals are sequentially inputted, recognizing ة;

when ﺀﻭﭞ key signals are sequentially inputted, recognizing ؤ or ء̂;

when ﻩﺀ, ﺹﺀ, ﻩﺭﺀ or ﺹﺭﺀ key signals are sequentially inputted, recognizing ئ;

when ﭞﭞﭞ or ﭞحﭞﭞ key signals are sequentially inputted, recognizing چ;

when ﺭ·· key signals are sequentially inputted, recognizing ژ;

when ﭞﭞﭞﻭ or ﭞﭞﭞﭞﻭ key signals are sequentially inputted, recognizing پ; and when ﭞﻭﻉ key signals are sequentially inputted, recognizing .

9. The input apparatus as in claim 1, wherein the basic figures allocated to the basic keys include ە, ں, ح, ص, ﺀ, ﺍ, ﻩ, ·, ﺭ, and ﭞ.

10. The input apparatus as in claim 1, wherein the Alphabet database unit stores the Alphabet database unit stores information for, when ﺍﺍ or ﺍ key signal is sequentially inputted, recognizing ﺍ;

when ںﺙ key signals are sequentially inputted, recognizing ن;

when ںﭞ key signals are sequentially inputted, recognizing ب;

when حح or ح key signal is sequentially inputted, recognizing ح;

when ە or ەح key signals is sequentially inputted, recognizing ﺩ;

when ﺭﺭ or ﺭ key signal is sequentially inputted, recognizing ﺭ;

when ﺍﺍ or ﺍﺍﺍ key signals are sequentially inputted, recognizing س;

when ﺹﺍ key signals are sequentially inputted, recognizing ص;

when ﻁﺍ key signals are sequentially inputted, recognizing ط;

when ﻩﻭﺙ key signals are sequentially inputted, recognizing ع;

when ﻩﺍ or ﻭﺙﺙ key signals are sequentially inputted, recognizing ﻑ;

when ﺍﻭ key signals are sequentially inputted, recognizing ﻝ;

when ﻩﺍ key signals are sequentially inputted, recognizing ﻡ;

when ﻩﻩ or ﻩ key signal is sequentially inputted, recognizing ﻩ;

when ﻩﺭ or ﺹﺭ key signals are sequentially inputted, recognizing ﻭ;

when ٮں key signals are sequentially inputted, recognizing ى or ؛ and when ںء or ٮںء key signals are sequentially inputted, recognizing ئ.

11. The input apparatus as in claim 1, wherein the database unit stores information for, when ١ key signals are sequentially inputted, recognizing ا؛ when ١٠ key signals are sequentially inputted, recognizing أ؛ when ٮ:: key signals are sequentially inputted, recognizing ث؛ when ح: key signals are sequentially inputted, recognizing ث؛ when ح key signals are sequentially inputted, recognizing ح.؛ when خ key signals are sequentially inputted, recognizing ح.ى؛ when ر. key signals are sequentially inputted, recognizing ر؛ when ںں. key signals are sequentially inputted, recognizing ز؛ when ںں::, ںں:::, ںںں:, ںںں::, ںںں:: or ںںں key signals are sequentially inputted, recognizing ش؛ when صں. key signals are sequentially inputted, recognizing ض؛ when ـاـ key signals are sequentially inputted, recognizing ط؛ when ىح. key signals are sequentially inputted, recognizing غ؛ when هں. or هں:: key signals are sequentially inputted, recognizing ڤ؛ when رء, ںء or اء key signals are sequentially inputted, recognizing ك؛ when ه. or ه:. key signals are sequentially inputted, recognizing ة؛ when ںں key signals are sequentially inputted, recognizing ۇ or ۆ؛ when هء, صء, هرء or صرء key signals are sequentially inputted, recognizing ؤ؛ when ؊؊؊ or ؊ى؊؊ key signals are sequentially inputted, recognizing ج؛ when ر::: key signals are sequentially inputted, recognizing ژ؛ when ں؊؊ or ں؊؊؊ key signals are sequentially inputted, recognizing پ؛ and when ىں؊ or ىں؊ key signals are sequentially inputted, recognizing چ.

12. A method for inputting Arabic-Persian Alphabet characters comprising the steps of:

providing an Alphabet input unit having basic keys and a function key, wherein basic figures extracted from analyzed forms of Arabic Alphabet are allocated to the basic keys wherein the basic keys further include variation keys;

conveying over or under Arabic characters to vary pronunciations by inscribing the over or under characters using the variation keys;

storing Arabic Alphabet information coded to correspond to basic key input signal combinations of the Alphabet input unit in an Alphabet database unit;

providing an Alphabet extracting unit for searching the Alphabet database unit to extract Arabic alphabets corresponding to combinations of initial basic key input signals inputted from the Alphabet input unit or basic key input signals following a function key signal; and providing a combined form determining unit such that, when a character extracted by the Alphabet extracting unit is consecutive to a previously extracted character, a form database unit is searched to determine a combined form of the two extracted characters.

13. The method as in claim 12, wherein the Alphabet database unit further stores information for recognizing a character according to an order displayed on the key when a variation key input signal is inputted one or more times, and further comprising the step of storing information on attachment positions of Arabic characters attached over or under characters to vary their pronunciations.

14. The method as in claim 12, further comprising the step of providing a function to make a space at a next position of the characters when a predetermined sequence of characters as represented by the basic keys are activated.

15. The method as in claim 12, wherein the basic figures allocated to the basic keys include ≠ and ≉ and further comprising the step of storing information as follows, when ء or ى key signal is sequentially inputted, recognizing ح؛ when ىء key signals are sequentially inputted, recognizing ج؛ when ذ key signals are sequentially inputted, recognizing ب؛ when ۀ key signals are sequentially inputted, recognizing ا؛ when ١ or ل key signal is sequentially inputted, recognizing ذ؛ when ل or ل key signal is sequentially inputted, recognizing اا؛ when ں or ن key signals are sequentially inputted, recognizing ںح؛ when ب key signals are sequentially inputted, recognizing حت؛ when ح key signals are sequentially inputted, recognizing دد؛ when رر key signals are sequentially inputted, recognizing ںں؛ when ںںں or س key signals are sequentially inputted, recognizing صں؛ when ص key signals are sequentially inputted, recognizing ط؛ when ط signals are sequentially inputted, recognizing حح؛ when ع or هں key signal is sequentially inputted, recognizing هں؛ when هں. or ـف key signals are sequentially inputted, recognizing اس؛ when ل key signals are sequentially inputted, recognizing ما or م؛ and when هه or هر key signals are sequentially inputted, recognizing صر.

16. The method as in claim 15, wherein the database unit stores information as follows, when ﺩ key signals are sequentially inputted, recognizing ﻜ;

when ﻱ key signals are sequentially inputted, recognizing ;

when ﻱﻋ key signals are sequentially inputted, recognizing ﻜﻋ;

when ﺪ key signals are sequentially inputted, recognizing ﺍﻋ;

when ﺍﻋﻋ or ﻜ ... key signals are sequentially inputted, recognizing ﻜ ...;

when ﺪ or ﺡﺡ key signals are sequentially inputted, recognizing ﺡﻋﺡ;

when ﺝ key signals are sequentially inputted, recognizing ﺡ .;

when ﺡﻋ . key signals are sequentially inputted, recognizing ﻍ;

when ﺩ . or ﺯ key signals are sequentially inputted, recognizing ﺭ .;

when ﺯ signals are sequentially inputted, recognizing ﻜﻜ .;

when ﻜﻜ .. key signals are sequentially inputted, recognizing ﻜﻜ ...;

when ﻜﻜﻜ . key signals are sequentially inputted, recognizing ﻜﻜﻜ ..;

when ﻜﻜﻜ ... or ﺵ key signals are sequentially inputted, recognizing ﺺﻜ .;

when ﺽ, ﺼ . or ﻁ key signals are sequentially inputted, recognizing ﻋﻋ .;

when ﻍ or ﻩﻜ . key signals are sequentially inputted, recognizing ﻩﻜ ..;

when ﻩﺭ key signals are sequentially inputted, recognizing ﻕ or ﺭﻋ;

when ﻜﻋ or ﺍﻜﻋ key signals are sequentially inputted, recognizing ﻙ;

when ﻩ . or ﻩ .. key signals are sequentially inputted, recognizing ﻩ;

when ﺓ key signals are sequentially inputted, recognizing ﺓ;

when ﻩ ﻋ or ﺺ ﻋ key signals are sequentially inputted, recognizing ﻩﺭﻋ; and when ﺼﺭﻋ key signals are sequentially inputted, recognizing ﻩ.

17. The method as in claim 12, wherein the basic figures allocated to the basic keys include ﺍ, and ﺺ, and further comprising the step of storing information as follows, when ﻉ or ﻎ key signal is sequentially inputted, recognizing ﺡ;

when ﺝ key signals are sequentially inputted, recognizing ﺡ;

when ﺡﺡﺡ key signals are sequentially inputted, recognizing ﺏ;

when ﺡﻋﺡﺡ or ﺝ key signal is sequentially inputted, recognizing ﺍ;

when ﺭ .. or ﺯ key signals is sequentially inputted, recognizing ﺯ;

when ﺭ or ﺯ key signal is sequentially inputted, recognizing ﺍﺍ;

when ﻜ or ﻥ key signals are sequentially inputted, recognizing ﻜﺡ;

when ﺏ key signals are sequentially inputted, recognized ﺡﻋ;

when ﺡ key signals are sequentially inputted, recognizing ﺩﺩ;

when ﻜﺡﺡ key signals are sequentially inputted, recognizing ﻜﻜ;

when ﻜﻜﻜ or ﻜﺡﺡﺡ key signals are sequentially inputted, recognizing ﺏ;

when ﺹ key signals are sequentially inputted, recognizing ﺼ;

when ﻁ key signals are sequentially inputted, recognizing ﻋﻋ;

when ﻉ or ﻩﻜ key signal is sequentially inputted, recognizing ﻩﻜ;

when ﻩﻜ . or ﻑ key signals are sequentially inputted, recognizing ﺍﻜ;

when ﻝ key signals are sequentially inputted, recognizing ﻩﺍ or ﻩﺍ; and when ﻩﻩ or ﻩﺭ key signals are sequentially inputted, recognizing ﺼﺭ.

18. The method as in claim 17, wherein the database unit stores information as follows, when ﺩ key signals are sequentially inputted, recognizing ﻜ;

when ﻱ key signals are sequentially inputted, recognizing ;

when ﻜﻋﺡ key signals are sequentially inputted, recognizing ﻜﻋ;

when ﻜﺙ key signals are sequentially inputted, recognizing ﺍﻋ;

when ﻜﺡ key signals are sequentially inputted, recognizing ﻜ ...;

when ﺡﺡ key signals are sequentially inputted, recognizing ﺡﻋﺡ;

when ﻐﻐ key signals are sequentially inputted, recognizing ﺡ .;

when ﻐ key signals are sequentially inputted, recognizing ﻍ;

when ﻐﺡ or ﻩﻜﺙ key signals are sequentially inputted, recognizing ﺭ .;

when ﻜﺙﺙ key signals are sequentially inputted, recognizing ﻜﻜ .;

when ﻜﺙﺙﺙ key signals are sequentially inputted, recognizing ﻜﻜ ...;

when ﺡﺙ key signals are sequentially inputted, recognizing ﻜﻜﻜ ..;

when ﺝ or ﺡﺙ key signals are sequentially inputted, recognizing ﺺﻜ .;

when ﺽ, ﺼ . or ﻁ key signals are sequentially inputted, recognizing ﻋﻋ .;

when ﻍ or ﻐﺙ key signals are sequentially inputted, recognizing ﻩﻜ ..;

when ﺭﺙ key signals are sequentially inputted, recognizing ﻕ or ﺭﻋ;

when ⌣ꜜ or |⌣ꜜ key signals are sequentially inputted, recognizing ㄹ;

when ⌣⌣ᆢ or ⌣⌣ᆢᆢ key signals are sequentially inputted, recognizing ㅎ;

when ⌣⌣ᆢᆢᆢ key signals are sequentially inputted, recognizing ㅊ;

when ⌣⌣⌣ᆢ or ⌣⌣⌣ᆢᆢ key signals are sequentially inputted, recognizing ㅋ; and when ⌣⌣⌣ᆢᆢ or ⌣⌣⌣ key signals are sequentialy inputted, recognizing ㆍ.

* * * * *